US010656768B2

(12) United States Patent
Huang et al.

(10) Patent No.: US 10,656,768 B2
(45) Date of Patent: May 19, 2020

(54) TOUCH DISPLAY PANEL WITH REDUCED THICKNESS AND MANUFACTURING METHOD THEREOF

(71) Applicant: Novatek Microelectronics Corp., Hsinchu (TW)

(72) Inventors: He-Wei Huang, Hsinchu (TW); Chih-Jen Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 630 days.

(21) Appl. No.: 15/207,516

(22) Filed: Jul. 12, 2016

(65) Prior Publication Data

US 2018/0018036 A1    Jan. 18, 2018

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01); *G06F 2203/04103* (2013.01)

(58) Field of Classification Search
CPC ...................................................... G06F 3/044
See application file for complete search history.

(56) References Cited

U.S. PATENT DOCUMENTS

| | | | | |
|---|---|---|---|---|
| 8,988,384 B2 | 3/2015 | Krah et al. | | |
| 2011/0069036 A1* | 3/2011 | Anno | .................. | G06F 3/03545 345/174 |
| 2011/0090175 A1* | 4/2011 | Mamba | .................. | G06F 3/0412 345/174 |
| 2012/0075243 A1* | 3/2012 | Doi | ........................ | G06F 3/0416 345/174 |
| 2012/0098788 A1* | 4/2012 | Sekiguchi | ............... | G06F 3/044 345/174 |
| 2012/0274603 A1* | 11/2012 | Kim | ...................... | G06F 3/0412 345/174 |
| 2013/0068038 A1* | 3/2013 | Bolender | ................ | G01L 1/142 73/862.626 |

(Continued)

FOREIGN PATENT DOCUMENTS

CN    104123021    10/2014

OTHER PUBLICATIONS

"Office Action of China Counterpart Application," dated Feb. 3, 2020, p. 1-p. 11.

*Primary Examiner* — William Boddie
*Assistant Examiner* — Andrew B Schnirel
(74) *Attorney, Agent, or Firm* — JCIPRNET (57) ABSTRACT

A touch display panel and a manufacturing method thereof are provided. The touch display panel includes a substrate, a conductor, a first pressure sensing electrode and a second pressure sensing electrode. The conductor is stacked under the substrate, and the conductor is not connected to a bias. The first pressure sensing electrode is disposed on the substrate and disposed above the conductor. A compression zone exists between the first pressure sensing electrode and the conductor, so as to form a first pressure sensing capacitor. The second pressure sensing electrode is disposed on the substrate and disposed above the conductor. The compression zone exists between the second pressure sensing electrode and the conductor, so as to form a second pressure sensing capacitor connected in series with the first pressure sensing capacitor.

6 Claims, 4 Drawing Sheets

(56) References Cited

U.S. PATENT DOCUMENTS

2016/0098131 A1\* 4/2016 Ogata ................ G06F 1/1643
                                                    345/173
2017/0168641 A1\* 6/2017 Cheng ................ G06F 3/044

\* cited by examiner

TOUCH DISPLAY PANEL WITH REDUCED THICKNESS AND MANUFACTURING METHOD THEREOF

BACKGROUND

Field of the Invention

The invention relates to a pressure sensing panel, and more particularly to a touch display panel and a manufacturing method thereof.

Description of Related Art

Figure 1:
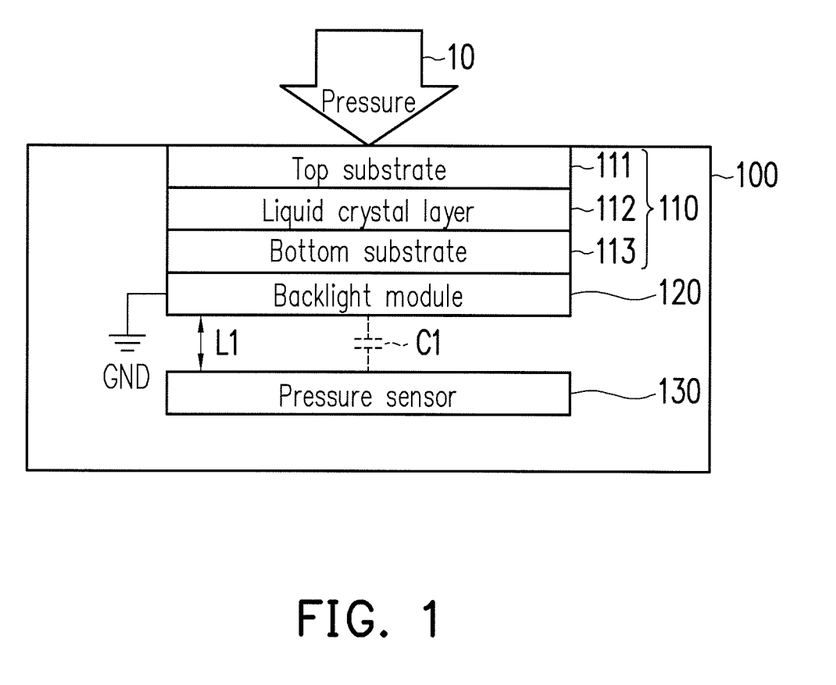
FIG. 1 is a schematic cross-sectional view of a conventional electronic apparatus with a pressure sensing function.

A touch display panel may be disposed in a mobile electron apparatus for providing a display function and a touch control function. In some products, a pressure sensor may be additionally disposed under the touch display panel for providing a pressure sensing function. FIG. 1 is a schematic cross-sectional view of a conventional electronic apparatus 100 with a pressure sensing function. The conventional electronic apparatus 100 includes a display panel 110, a backlight module modules 120 and a pressure sensor 130. The display panel 110 has a top substrate 111, a liquid crystal layer 112 and a bottom substrate 113. The liquid crystal layer 112 is disposed between the top substrate 111 and the bottom substrate 113. The backlight module 120 is stacked under the display panel 110. The backlight module 120 provides a backlight source to the display panel 110, and the liquid crystal display panel 110 displays an image.

The pressure sensor 130 is stacked under the backlight module 120. A gap (having a distance of an interval L1) exists between the pressure sensor 130 and the backlight module 120. The backlight module 120 may be used as an electrode plate of a parasitic capacitor $C_1$, and the pressure sensor 130 may be used as another electrode plate of the parasitic capacitor $C_1$. The backlight module 120 (i.e., the electrode plate of the parasitic capacitor $C_1$) has to be connected to a bias, e.g., a ground voltage GND. In a situation that a pressure 10 is not yet applied to the display panel 110, the interval L1 between the pressure sensor 130 and the backlight module 120 keeps unchanged. When the pressure 10 is applied to the display panel 110, the display panel 110 and the backlight module 120 are deformed, such that the interval L1 becomes smaller (i.e., a capacitance of the parasitic capacitor $C_1$ increases). The pressure sensor 130 senses a variation amount of the capacitance of the parasitic capacitor $C_1$. The variation amount of the capacitance of the parasitic capacitor $C_1$ may be used to estimate a size of the pressure 10. Because a specific interval L1 (for accommodating the deformation of the backlight module 120) has to be kept between the additionally disposed pressure sensor 130 and the backlight module 120, the thickness of the conventional electronic apparatus 100 is increased due to the additionally disposed pressure sensor 130 and the interval L1.

SUMMARY

The application provides a touch display panel and a manufacturing method thereof capable of measuring a pressure applied to a first substrate by using a first pressure sensing capacitor and a second pressure sensing capacitor connected in series.

According to an embodiment of the invention, a touch display panel is provided. The touch display panel includes a first substrate, a conductor, a first pressure sensing electrode and a second pressure sensing electrode. The conductor is stacked under the substrate and is not connected to a bias. The first pressure sensing electrode is disposed on the substrate and disposed above the conductor. A compression zone exists between the first pressure sensing electrode and the conductor, so as to form a first pressure sensing capacitor. The second pressure sensing electrode is disposed on the first substrate and disposed above the conductor. The compression zone exists between the second pressure sensing electrode and the conductor, so as to form a second pressure sensing capacitor connected in series with the first pressure sensing capacitor.

According to an embodiment of the invention, a manufacturing method of a touch display panel is provided. The manufacturing method includes: providing a first substrate and a conductor, wherein the conductor is not connected to a bias; disposing a first pressure sensing electrode on the first substrate; disposing a second pressure sensing electrode on the first substrate; and stacking the first substrate above the conductor, so as to dispose the first pressure sensing electrode and the second pressure sensing electrode above the conductor. A compression zone exists between the first pressure sensing electrode and the conductor, so as to form a first pressure sensing capacitor, and the compression zone exists between the second pressure sensing electrode and the conductor, so as to form a second pressure sensing capacitor connected in series with the first pressure sensing capacitor.

To sum up, in the touch display panel and the manufacturing method thereof provided by the embodiments of the invention, both the first pressure sensing electrode and the second pressure sensing electrode are disposed on the first substrate. The first pressure sensing electrode and the conductor have the compression zone therebetween, such that the first pressure sensing capacitor is formed, and the second pressure sensing electrode and the conductor have the compression zone therebetween, such that the second pressure sensing capacitor connected in series with the first pressure sensing capacitor is formed. The first pressure sensing capacitor and the second pressure sensing capacitor connected in series can be used for measuring the pressure applied to the first substrate.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

Figure 2:
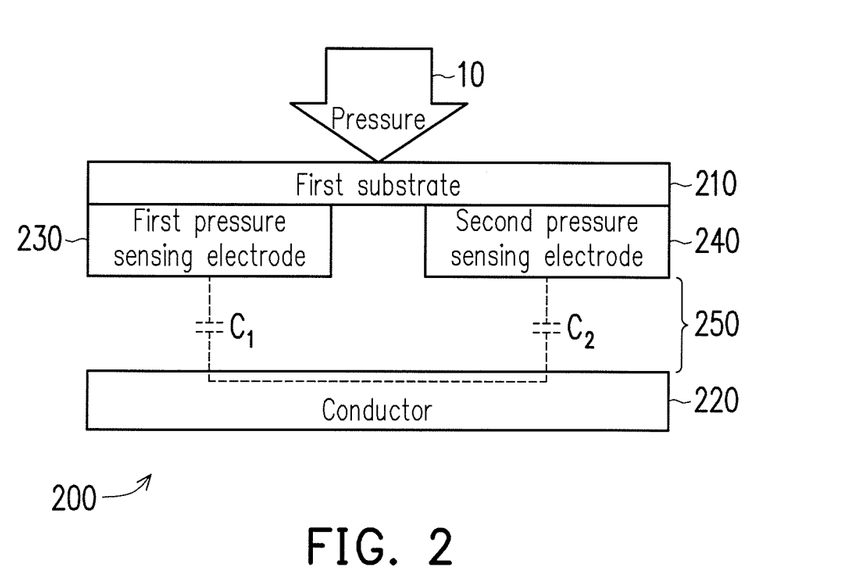
FIG. 2 is a schematic cross-sectional view of a touch display panel according to an embodiment of the invention.

FIG. 2 is a schematic cross-sectional view of a touch display panel 200 according to an embodiment of the invention. The touch display panel 200 includes a first substrate 210, a conductor 220, a first pressure sensing electrode 230 and a second pressure sensing electrode 240. The conductor 220 is stacked under the first substrate 210. A material of the first substrate 210 may be any nonconductive material, e.g., plastic, glass or the like. The first pressure sensing electrode 230 is disposed under the first substrate 210 and disposed above the conductor 220. A compression zone 250 exists between the first pressure sensing electrode 230 and the conductor 220. In some embodiments, the compression zone 250 is a gap between the first pressure sensing electrode 230 and the conductor 220. In other embodiments, the compression zone 250 is an elastic material filled between the first pressure sensing electrode 230 and the conductor 220. The first pressure sensing electrode 230 and the conductor 220 form a first pressure sensing capacitor $C_1$. The second pressure sensing electrode 240 is disposed under the first substrate 210 and disposed above the conductor 220. The second pressure sensing electrode 240 is not electrically connected with (i.e., does not electrically contact) the first pressure sensing electrode 230. The compression zone 250 exists between the second pressure sensing electrode 240 and the conductor 220. The second pressure sensing electrode 240 and the conductor 220 form a second pressure sensing capacitor $C_2$, and the second pressure sensing capacitor $C_2$ is connected to the first pressure sensing capacitor $C_1$ in series through the conductor 220.

The conductor 220 is not connected to any bias. Namely, the conductor 220 is electrically in a floating state. The first pressure sensing capacitor $C_1$ and the second pressure sensing capacitor $C_2$ connected in series may be used for transmitting a signal. One of the first pressure sensing electrode 230 and the second pressure sensing electrode 240 may be used as a transmitter electrode Tx, and the other one of the first pressure sensing electrode 230 and the second pressure sensing electrode 240 may be used as a receiver electrode Rx. For example (but not limited to), the first pressure sensing electrode 230 may be connected to a driving circuit (not shown), and the second pressure sensing electrode 240 may be connected to a reading circuit (not shown). The driving circuit (not shown) may transmit a driving signal (i.e., a square wave pulse) to the first pressure sensing electrode 230. The driving signal may be transmitted to the second pressure sensing electrode 240 through the first pressure sensing capacitor $C_1$ and the second pressure sensing capacitor $C_2$ connected in series. The reading circuit (not shown) may read/sense the driving signal of the second pressure sensing electrode 240, so as to obtain a total capacitance (i.e., a mutual capacitance) of the first pressure sensing capacitor $C_1$ and the second pressure sensing capacitor $C_2$.

In a situation that the pressure 10 is not yet applied to the first substrate 210, the compression zone 250 between the first pressure sensing electrode 230 (or the second pressure sensing electrode 240) and the conductor 220 remains unchanged. When the pressure 10 is applied to the first substrate 210, the first substrate 210 is deformed, such that the compression zone 250 becomes smaller (i.e., the total capacitance of the first pressure sensing capacitor $C_1$ and the second pressure sensing capacitor $C_2$ increases). The reading circuit (not shown) may sense a variation amount of the total capacitance of the first pressure sensing capacitor $C_1$ and the second pressure sensing capacitor $C_2$. The variation amount of the total capacitance of the first pressure sensing capacitor $C_1$ and the second pressure sensing capacitor $C_2$ may be used for estimating corresponding deformation, so as to estimate a size of the pressure 10. Due to both the first pressure sensing electrode 230 and second pressure sensing electrode 240 being disposed on the first substrate 210, the thickness of the touch display panel 200 may be effectively reduced.

In other embodiments, the first pressure sensing electrode 230 and the second pressure sensing electrode 240 may be used as receiver electrodes Rx and connected to the reading circuit (not shown). The reading circuit (not shown) may read/sense a capacitance (i.e., a self capacitance) of the first pressure sensing capacitor $C_1$ and a capacitance (i.e., a self capacitance) of the second pressure sensing capacitor $C_2$. When the pressure 10 is applied to the first substrate 210, variation amounts of the self capacitances of the first pressure sensing capacitor $C_1$ and the second pressure sensing capacitor $C_2$ may be used for estimating the size of the pressure 10.

Figure 3:
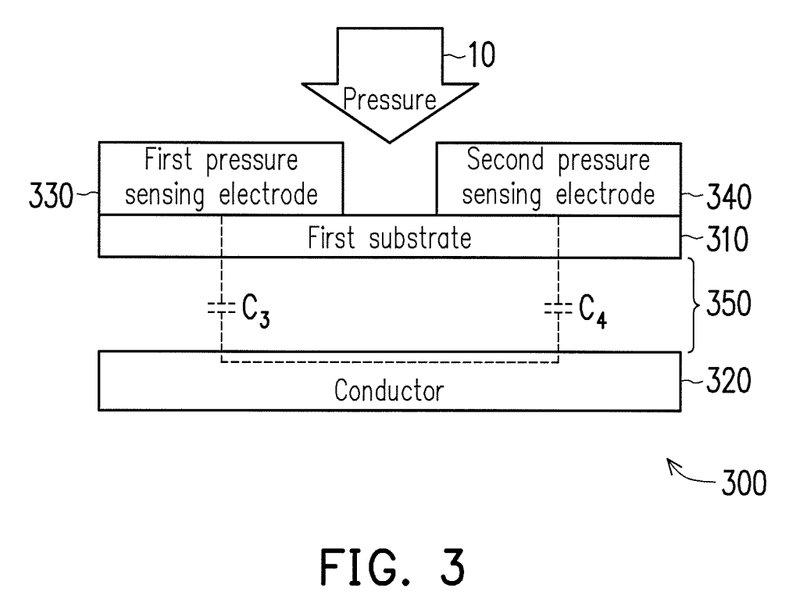
FIG. 3 is a schematic cross-sectional view of a touch display panel according to another embodiment of the invention.

FIG. 3 is a schematic cross-sectional view of a touch display panel 300 according to an embodiment of the invention. The touch display panel 300 includes a first substrate 310, a conductor 320, a first pressure sensing electrode 330 and a second pressure sensing electrode 340. A compression zone 350 exists between the first substrate 310 and the conductor 320. In some embodiments, the compression zone 350 is a gap between the first substrate 310 and the conductor 320. In other embodiments, the compression zone 350 is an elastic material filled between the first substrate 310 and the conductor 320. The touch display panel 300, the first substrate 310, the conductor 320, the first pressure sensing electrode 330, the second pressure sensing electrode 340 and the compression zone 350 illustrated in FIG. 3 may refer to the descriptions related to the touch display panel 200, the first substrate 210, the conductor 220, the first pressure sensing electrode 230, the second pressure sensing electrode 240 and the compression zone 250 illustrated in FIG. 2 and thus, will not be repeated hereinafter. The touch display panel 200 illustrated in FIG. 2 may also be inferred with reference to the description related to the description illustrated in FIG. 3.

In the embodiment illustrated in FIG. 3, the first pressure sensing electrode 330 is disposed on the first substrate 310, the second pressure sensing electrode 340 is disposed on the first substrate 310, and the first substrate 310 is disposed above the conductor 220. The first pressure sensing electrode 330 and the conductor 320 form a first pressure sensing capacitor $C_3$, and the second pressure sensing electrode 340 and the conductor 320 form a second pressure sensing capacitor $C_4$. The second pressure sensing capacitor $C_4$ is connected to the first pressure sensing capacitor $C_3$ in series through the conductor 320. One of the first pressure sensing electrode 330 and the second pressure sensing electrode 340 may be used as a transmitter electrode Tx, and the other one of the first pressure sensing electrode 330 and the second pressure sensing electrode 340 may be used as a receiver electrode Rx. For example (but not limited to), the first pressure sensing electrode 330 may be connected to a driving circuit (not shown), and the second pressure sensing electrode 340 may be connected to a reading circuit (not shown). The driving circuit (not shown) may transmit a driving signal (i.e., a square wave pulse) to the first pressure sensing electrode 330. The driving signal may be transmitted to the second pressure sensing electrode 340 through the first pressure sensing capacitor $C_3$ and the second pressure sensing capacitor $C_4$ connected in series. The reading circuit (not shown) may read/sense the driving signal of the second pressure sensing electrode 340, so as to obtain a total capacitance (i.e., a mutual capacitance) of the first pressure sensing capacitor $C_3$ and the second pressure sensing capacitor $C_4$.

In a situation that the pressure 10 is not yet applied to the first substrate 310, the compression zone 350 between the first pressure sensing electrode 330 (or the second pressure sensing electrode 340) and the conductor 320 remains unchanged. When the pressure 10 is applied to the first substrate 310, the first substrate 310 is deformed, such that the compression zone 350 becomes smaller (i.e., the total capacitance of the first pressure sensing capacitor $C_3$ and the second pressure sensing capacitor $C_4$ increases). The reading circuit (not shown) may sense a variation amount of the total capacitance of the first pressure sensing capacitor $C_3$ and the second pressure sensing capacitor $C_4$. The variation amount of the total capacitance of the first pressure sensing capacitor $C_3$ and the second pressure sensing capacitor $C_4$ may be used for estimating corresponding deformation, so as to estimate a size of the pressure 10. Due to both the first pressure sensing electrode 330 and second pressure sensing electrode 340 being disposed on the first substrate 310, the thickness of the touch display panel 300 may be effectively reduced.

In other embodiments, the first pressure sensing electrode 330 and the second pressure sensing electrode 340 may be used as receiver electrodes Rx and connected to the reading circuit (not shown). The reading circuit (not shown) may read/sense a capacitance (i.e., a self capacitance) of the first pressure sensing capacitor $C_3$ and a capacitance (i.e., a self capacitance) of the second pressure sensing capacitor $C_4$. When the pressure 10 is applied to the first substrate 310, variation amounts of the self capacitances of the first pressure sensing capacitor $C_3$ and the second pressure sensing capacitor $C_4$ may be used for estimating the size of the pressure 10.

Figure 4:
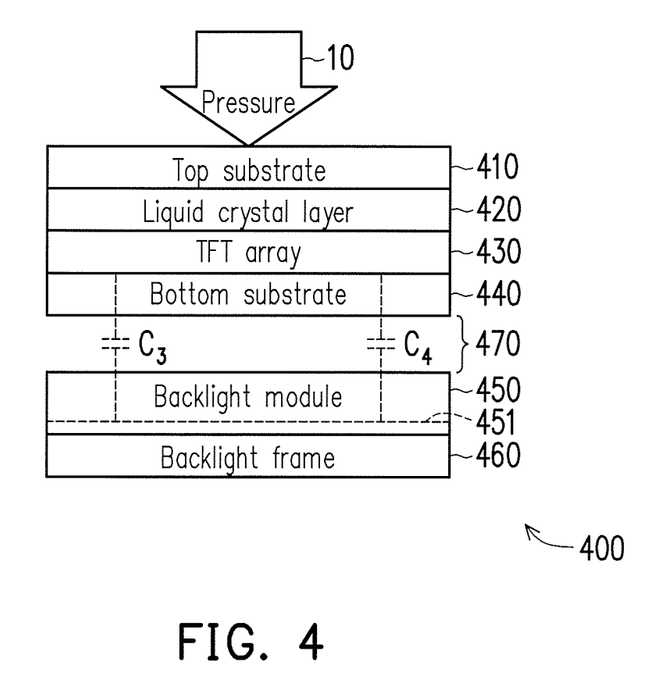
FIG. 4 is a schematic cross-sectional view of an example of applying the touch display panel depicted in FIG. 3 to a thin film transistor (TFT) display panel according to an embodiment of the invention.

FIG. 4 is a schematic cross-sectional view of an example of applying the touch display panel 300 depicted in FIG. 3 to a thin film transistor (TFT) display panel according to an embodiment of the invention. A TFT display panel 400 (i.e., a touch display panel) illustrated in FIG. 4 includes a top substrate 410 (i.e., a second substrate), a liquid crystal layer 420, a thin-film transistor (TFT) array 430, a bottom substrate (i.e., a first substrate) 440, a backlight module 450 and a backlight frame 460. Based on design demands, the top substrate 410 may have a color filter layer. The top substrate 410 is stacked above the bottom substrate 440. The TFT array 430 is disposed on a surface of the bottom substrate 440. The liquid crystal layer 420 is disposed between the top substrate 410 and the TFT array 430. The backlight module 450 is stacked under the bottom substrate 440, wherein a compression zone 470 exists between the backlight module 450 and the bottom substrate 440. In some embodiments, the compression zone 470 is a gap between the backlight module 450 and the bottom substrate 440. In other embodiments, the compression zone 470 is an elastic material filled between the backlight module 450 and the bottom substrate 440. The backlight frame 460 is stacked under the backlight module 450 and used for increasing rigidity of the backlight module 450.

The layout structure of the TFT array 430 shall not be limited. In some embodiments, the layout structure of the TFT array 430 may be a conventional layout or any other layout, and therefore, the illustration of source lines (or data lines), gate lines (or scan lines), liquid crystal capacitor electrodes and common electrodes in the TFT array 430 is omitted in FIG. 4. The first pressure sensing electrode 330 and second pressure sensing electrode 340 illustrated in FIG. 3 may be disposed in the TFT array 430. For example, one of the source lines (or the data lines), the gate lines (or the scan lines), the liquid crystal capacitor electrodes and/or the common electrodes in the TFT array 430 may be configured as the first pressure sensing electrode 330 and/or the second pressure sensing electrode 340 illustrated in FIG. 3 (or the first pressure sensing electrode 230 and/or the second pressure sensing electrode 240 illustrated in FIG. 2). For example (but not limited to), one of the source lines (or the data lines) in the TFT array 430 may serve as the first pressure sensing electrode 330 in a time division multiplexing manner, while one of the gate lines (or the scan lines) in the TFT array 430 may serve as the second pressure sensing electrode 340 in the time division multiplexing manner.

During a display driving period, the gate line in the TFT array 430 is switched to connect a gate driver (not shown), and the source line in the TFT array 430 is switched to connect a source driver (not shown). The gate driver (not shown) and the source driver (not shown) may drive the TFT array 430 to control the liquid crystal layer 420 for displaying an image. Detailed description related to the display driving period pertains to the conventional technique and thus, will not be repeated hereinafter. During a pressure sensing period, for example, the source line in the TFT array 430 may be switched to connect a driving circuit (not shown), the gate line in the TFT array 430 may be switched to connect a reading circuit (not shown). In other words, during the pressure sensing period, the source line in the TFT array 430 may serve as the first pressure sensing electrode 330 illustrated in FIG. 3, and the gate line in the TFT array 430 may serve as the second pressure sensing electrode 340 illustrated in FIG. 3. The bottom substrate 440 may be considered as the first substrate 310 illustrated in FIG. 3.

The layout structure of the backlight module 450 shall not be limited. In some embodiments, the layout structure of the backlight module 450 may be a conventional layout or any other layout. Based on design demands, a reflector layer 451 may be disposed in the backlight module 450 for reflecting a backlight to the liquid crystal layer 420. In the present embodiment, a material of the reflector layer 451 may include a conductor (e.g., metal or other conductive materials). The reflector layer 451 (i.e., a metal reflector layer) is not connected to any bias, i.e., the reflector layer 451 is electrically in a floating state. Thus, during the pressure sensing period, the reflector layer 451 may serve as the conductor 320 illustrated in FIG. 3. The electrode (i.e., the first pressure sensing electrode 330) and the reflector layer 451 (i.e., the conductor 320) disposed in the TFT array 430 form the first pressure sensing capacitor $C_3$, and the other electrode (i.e., the second pressure sensing electrode 340) and the reflector layer 451 (i.e., the conductor 320) in the TFT array 430 form the second pressure sensing capacitor $C_4$. The second pressure sensing capacitor $C_4$ is connected to the first pressure sensing capacitor $C_3$ in series through the reflector layer 451.

In a situation that the pressure 10 is not yet applied to the top substrate 410, the compression zone 470 remains unchanged. When the pressure 10 is applied to the top substrate 410, the compression zone 470 becomes smaller (i.e., the total capacitance of the first pressure sensing capacitor $C_3$ and the second pressure sensing capacitor $C_4$ increases). The reading circuit (not shown) may sense the variation amount of the total capacitance of the first pressure sensing capacitor $C_3$ and the second pressure sensing capacitor $C_4$. The variation amount of the total capacitance of the first pressure sensing capacitor $C_3$ and the second pressure sensing capacitor $C_4$ may be used for estimating the size of the pressure 10.

Figure 5:
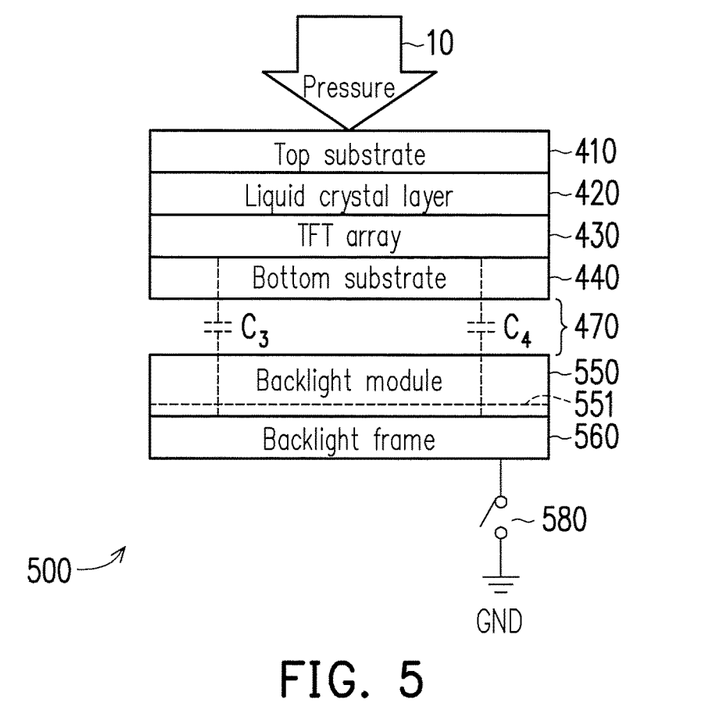
FIG. 5 is a schematic cross-sectional view of an example of applying the touch display panel depicted in FIG. 3 to a TFT display panel according to another embodiment of the invention.

FIG. 5 is a schematic cross-sectional view of an example of applying the touch display panel 300 depicted in FIG. 3 to a TFT display panel according to another embodiment of the invention. A TFT display panel 500 (i.e., a touch display panel) illustrated in FIG. 5 includes a top substrate 410 (i.e., a second substrate), a liquid crystal layer 420, a TFT array 430, a bottom substrate (i.e., a first substrate) 440, a backlight module 550 and a backlight frame 560. Based on design demands, the top substrate 410 may have a color filter layer. The top substrate 410, the liquid crystal layer 420, the TFT array 430, the bottom substrate 440, the backlight module 550 and the backlight frame 560 illustrated in FIG. 5 may refer to the descriptions related to the top substrate 410, the liquid crystal layer 420, the TFT array 430, the bottom substrate 440, the backlight module 550 and the backlight frame 560 illustrated in FIG. 4 and thus, will not be repeated hereinafter.

The layout structure of the backlight module 550 shall not be limited. In some embodiments, the layout structure of the backlight module 550 may be a conventional layout or any other layout. Based on design demands, a reflector layer 551 may be disposed in the backlight module 550 for reflecting backlight to the liquid crystal layer 420. In the embodiment illustrated in FIG. 5, a material of the reflector layer 551 may include a non-conductor. The backlight frame 560 is disposed under the backlight module 550 to support the backlight module 550. A material of the backlight frame 560 may include a conductor (e.g., metal or other conductive materials). During the pressure sensing period, the backlight frame 560 is not connected to any bias, i.e., the backlight frame 560 is electrically in a floating state. Thus, the backlight frame 560 may serve as the conductor 320 illustrated in FIG. 3.

The electrode (i.e., the first pressure sensing electrode 330) and the backlight frame 560 (i.e., the conductor 320) disposed in the TFT array 430 form the first pressure sensing capacitor $C_3$, and the other electrode (i.e., the second pressure sensing electrode 340) and the backlight frame 560 (i.e., the conductor 320) in the TFT array 430 form the second pressure sensing capacitor $C_4$. The second pressure sensing capacitor $C_4$ is connected to the first pressure sensing capacitor $C_3$ in series through the backlight frame 560.

Based on design demands, the touch display panel 500 illustrated in FIG. 5 may further include a switch 580. A first terminal of the switch 580 is electrically connected to the backlight frame 260 (i.e., the conductor 320), and a second terminal of the switch 580 is electrically connected to a certain reference voltage (i.e., a ground voltage GND). During the pressure sensing period, the switch 580 is turned off, such that the backlight frame 560 is not connected to any bias. Thus, during the pressure sensing period, the backlight frame 560 may transmit a signal between the first pressure sensing capacitor $C_3$ and the second pressure sensing capacitor $C_4$. During a non-pressure sensing period, the switch 580 is turned on, such that a voltage level of the backlight frame 560 is clamped to the ground voltage GND. Thus, during the non-pressure sensing period, the backlight frame 560 may be used as a shielding layer of the TFT display panel 500 for reducing noise interference.

Figure 6:
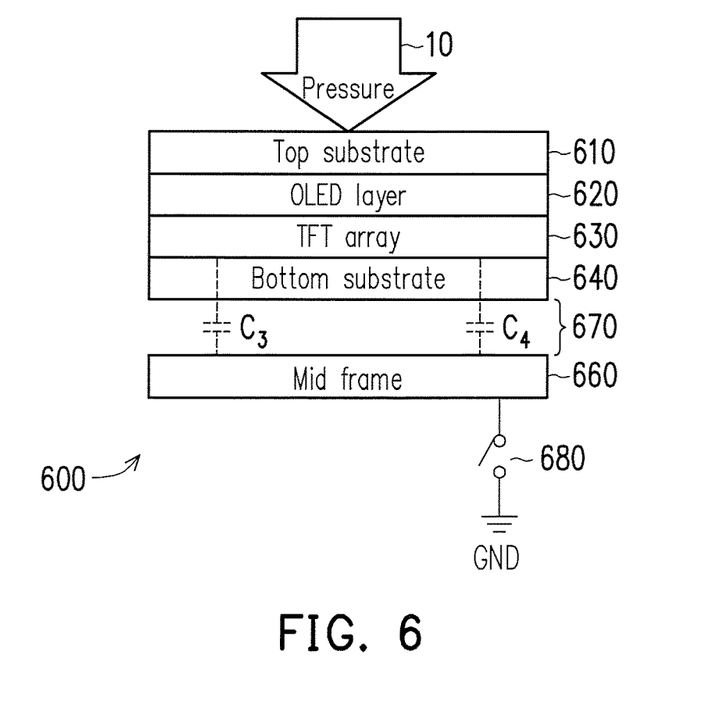
FIG. 6 is a schematic cross-sectional view of an example of applying the touch display panel depicted in FIG. 3 to an active matrix organic light emitting diode (AMOLED) display panel according to an embodiment of the invention.

FIG. 6 is a schematic cross-sectional view of an example of applying the touch display panel 300 depicted in FIG. 3 to an active matrix organic light emitting diode (AMOLED) display panel according to an embodiment of the invention. An AMOLED display panel 600 (i.e., a touch display panel) illustrated in FIG. 6 includes a top substrate 610 (i.e., a second substrate), an organic light emitting diode (OLED) layer 620, a TFT array 630, a bottom substrate (i.e., a first substrate) 640 and a mid frame 660. The top substrate 610 is stacked above the bottom substrate 640. The TFT array 630 is disposed on a surface of the bottom substrate 640. The OLED layer 620 is disposed between the top substrate 610 and the TFT array 630 and disposed between the top substrate 610 and the bottom substrate 640. The mid frame 660 is disposed under the bottom substrate 640 to support the touch display panel. A compression zone 670 exists between the mid frame 660 and the bottom substrate 640. In some embodiments, the compression zone 670 is a gap between the mid frame 660 and the bottom substrate 640. In other embodiments, the compression zone 670 is an elastic material filled between the mid frame 660 and the bottom substrate 640.

The layout structure of the TFT array 630 shall not be limited. In some embodiments, the layout structure of the TFT array 630 may be a conventional layout or any other layout, and therefore, the illustration of source lines (or data lines), gate lines (or scan lines), pixel electrodes and common electrodes in the TFT array 630 is omitted in FIG. 6. The first pressure sensing electrode 330 and the second pressure sensing electrode 340 may be disposed in the TFT array 630. For example, one of the source lines (or the data lines), the gate lines (or the scan lines), the pixel electrodes and/or the common electrodes in the TFT array 630 may be configured as the first pressure sensing electrode 330 and/or the second pressure sensing electrode 340 illustrated in FIG. 3 (or the first pressure sensing electrode 230 and/or the second pressure sensing electrode 240 illustrated in FIG. 2). For example (but not limited to), one of the source lines (or the data lines) in the TFT array 630 may serve as the first pressure sensing electrode 330 in a time division multiplexing manner, while one of the gate lines (or the scan lines) in the TFT array 630 may serve as the second pressure sensing electrode 340 in the time division multiplexing manner. The TFT array 630 illustrated in FIG. 6 may refer to the description related to the TFT array 430 illustrated in FIG.

4 and thus, will not be repeated hereinafter. The bottom substrate 640 may be considered as the first substrate 310 illustrated in FIG. 3.

A material of the mid frame 660 may include a conductor (e.g., metal or other conductive materials). During the pressure sensing period, the mid frame 660 is not connected to any bias, i.e., the mid frame 660 is electrically in a floating state. Thus, the mid frame 660 may serve as the conductor 320 illustrated in FIG. 3. The electrode (i.e., the first pressure sensing electrode 330) and the mid frame 660 (i.e., the conductor 320) disposed in the TFT array 630 form the first pressure sensing capacitor $C_3$, and the other electrode (i.e., the second pressure sensing electrode 340) and the mid frame 660 (i.e., the conductor 320) in the TFT array 630 form the second pressure sensing capacitor $C_4$. The second pressure sensing capacitor $C_4$ and the first pressure sensing capacitor $C_3$ are connected in series through the mid frame 660.

Based on design demands, the AMOLED display panel 600 illustrated in FIG. 6 may further include a switch 680. A first terminal of the switch 680 is electrically connected to the mid frame 660 (i.e., the conductor 320), and a second terminal of the switch 680 is electrically connected to a certain reference voltage (i.e., a ground voltage GND). During the pressure sensing period, the switch 680 is turned off, such that the mid frame 660 is not connected to any bias. Thus, during the pressure sensing period, the mid frame 660 may transmit a signal between the first pressure sensing capacitor $C_3$ and the second pressure sensing capacitor $C_4$. During a non-pressure sensing period, the switch 680 is turned on, such that a voltage level of the mid frame 660 is clamped to the ground voltage GND. Thus, during the non-pressure sensing period, the mid frame 660 may be used as a shielding layer of the AMOLED display panel 600 for reducing noise interference.

Figure 7:
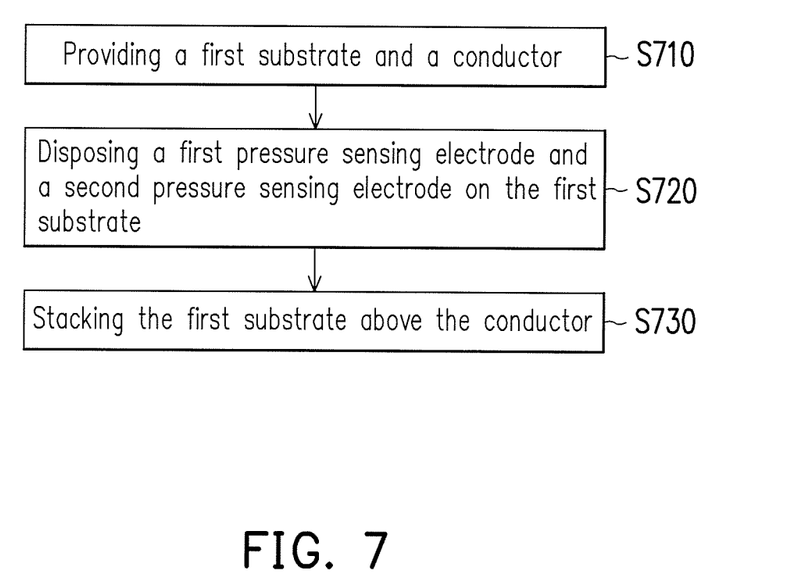
FIG. 7 is a flowchart of a manufacturing method of a touch display panel according to an embodiment of the present invention.

FIG. 7 is a flowchart of a manufacturing method of a touch display panel according to an embodiment of the present invention. In step S710, a first substrate and a conductor are provided, wherein the conductor is not connected to a bias. In step S720, a first pressure sensing electrode and a second pressure sensing electrode are disposed on the first substrate, wherein the second pressure sensing electrode is not electrically connected with the first pressure sensing electrode. In step S730, the first substrate is stacked above the conductor, such that the first pressure sensing electrode and the second pressure sensing electrode are disposed above the conductor. Therein, a compression zone exists between the first pressure sensing electrode and the conductor, such that a first pressure sensing capacitor is formed, and the compression zone exists between the second pressure sensing electrode and the conductor, such that a second pressure sensing capacitor connected in series with the first pressure sensing capacitor is formed.

In some embodiments, the manufacturing method further includes the following steps. A TFT array is disposed on the first substrate. A second substrate having a color filter layer is disposed above the first substrate. A liquid crystal layer is disposed between the first substrate and the second substrate, such that the TFT array is disposed between the liquid crystal layer and the first substrate. The first pressure sensing electrode and the second pressure sensing electrode are disposed in the TFT array.

In some embodiments, the manufacturing method further includes the following steps. A backlight module having a metal reflector layer is provided. The backlight module is stacked below the first substrate. The metal reflector layer is configured to reflect a backlight to the liquid crystal layer. A compression zone exists between the backlight module and the first substrate, and the metal reflector layer is used as the conductor.

In some embodiments, the manufacturing method further includes the following steps. The backlight module and a backlight frame are provided. The backlight module is stacked below the first substrate. The compression zone exists between the backlight module and the first substrate, and the backlight frame is disposed under the backlight module to support the backlight module, wherein the backlight frame is used as the conductor.

In some embodiments, the manufacturing method further includes the following steps. The second substrate is stacked above the first substrate. An OLED layer is disposed between the first substrate and the second substrate. The TFT array is disposed between the OLED layer and the first substrate. The first pressure sensing electrode and the second pressure sensing electrode are disposed in the TFT array.

In some embodiments, the manufacturing method further includes the following steps. A mid frame is disposed under the first substrate to support the touch display panel. A compression zone exists between the mid frame and the first substrate, and the mid frame is used as the conductor.

Based on the above, in the touch display panel and the manufacturing method thereof provided by the embodiments of the invention, both the first pressure sensing electrode and the second pressure sensing electrode are disposed on the first substrate. The first pressure sensing electrode and the conductor have the compression zone therebetween to form the first pressure sensing capacitor. The second pressure sensing electrode and the conductor have the compression zone therebetween to form the second pressure sensing capacitor. The first pressure sensing capacitor is connected with the second pressure sensing capacitor in series through the conductor. The first pressure sensing capacitor and the second pressure sensing capacitor connected in series can be used for measuring the pressure applied to the first substrate. Due to both the first pressure sensing electrode and second pressure sensing electrode being disposed on the first substrate, the thickness of the touch display panel can be effectively reduced.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A touch display panel, comprising:
   a first substrate;
   a conductor, stacked under the first substrate, wherein the conductor is not connected to a bias;
   a first pressure sensing electrode, disposed directly on the first substrate, and disposed above the conductor, wherein a compression zone exists between the first pressure sensing electrode and the conductor, so as to form a first pressure sensing capacitor; and
   a second pressure sensing electrode, disposed directly on the first substrate, and disposed above the conductor, wherein the compression zone exists between the second pressure sensing electrode and the conductor, so as to form a second pressure sensing capacitor connected in series with the first pressure sensing capacitor,
   wherein the compression zone comprises an entire region between the first pressure sensing electrode and the conductor, and an entire region between the second pressure sensing electrode and the conductor, and the compression zone is completely filled with an elastic material.

2. The touch display panel according to claim 1, further comprising:
   a second substrate, having a color filter layer stacked above the first substrate;
   a liquid crystal layer, disposed between the first substrate and the second substrate; and
   a thin-film transistor (TFT) array, disposed between the liquid crystal layer and the first substrate, wherein the first pressure sensing electrode and the second pressure sensing electrode are disposed in the TFT array.

3. The touch display panel according to claim 2, further comprising:
   a backlight module, having a metal reflector layer, stacked below the first substrate, wherein the compression zone exists between the backlight module and the first substrate, the metal reflector layer is configured to reflect a backlight to the liquid crystal layer, and the metal reflector layer is used as the conductor.

4. The touch display panel according to claim 2, further comprising:
   a backlight module, stacked below the first substrate, wherein the compression zone exists between the backlight module and the first substrate; and
   a backlight frame, disposed under the backlight module to support the backlight module, wherein the backlight frame is used as the conductor.

5. The touch display panel according to claim 1, further comprising:
   a second substrate, stacked above the first substrate;
   an organic light emitting diode (OLED) layer, disposed between the first substrate and the second substrate; and
   a TFT array, disposed between the OLED layer and the first substrate, wherein the first pressure sensing electrode and the second pressure sensing electrode are disposed in the TFT array.

6. The touch display panel according to claim 5, further comprising:
   a mid frame, disposed under the first substrate to support the touch display panel, wherein the compression zone exists between the mid frame and the first substrate, and the mid frame is used as the conductor.

* * * * *